US011759825B2

(12) United States Patent
Nilsson et al.

(10) Patent No.: US 11,759,825 B2
(45) Date of Patent: Sep. 19, 2023

(54) SYSTEM AND METHOD FOR RECYCLING PLANAR OBJECTS

(71) Applicant: SAINT-GOBAIN ECOPHON AB, Hyllinge (SE)

(72) Inventors: Erling Nilsson, Lund (SE); Johan Borgstrom, Lund (SE)

(73) Assignee: SAINT-GOBAIN ECOPHON AB, Hyllinge (SE)

(*) Notice: Subject to any disclaimer, the term of this patent is extended or adjusted under 35 U.S.C. 154(b) by 226 days.

(21) Appl. No.: 17/425,492

(22) PCT Filed: Jan. 20, 2020

(86) PCT No.: PCT/EP2020/051246
§ 371 (c)(1),
(2) Date: Jul. 23, 2021

(87) PCT Pub. No.: WO2020/156850
PCT Pub. Date: Aug. 6, 2020

(65) Prior Publication Data
US 2022/0080464 A1 Mar. 17, 2022

(30) Foreign Application Priority Data
Jan. 31, 2019 (EP) .................... 19154726

(51) Int. Cl.
*B07C 5/34* (2006.01)
*B07C 5/10* (2006.01)
(Continued)

(52) U.S. Cl.
CPC .............. *B07C 5/34* (2013.01); *B07C 5/10* (2013.01); *G06T 7/60* (2013.01); *H04R 1/02* (2013.01);
(Continued)

(58) Field of Classification Search
CPC ..... B07C 5/34; B07C 5/10; B07C 2501/0027; B07C 5/08; G06T 7/60; H04R 1/02; H04R 1/08; H04R 3/00; Y02W 30/62
(Continued)

(56) References Cited

U.S. PATENT DOCUMENTS 4,576,286 A * 3/1986 Buckley .................... B07C 5/04
209/558
5,632,381 A * 5/1997 Thust ....................... B07C 5/36
209/44.1
(Continued)

FOREIGN PATENT DOCUMENTS

WO WO-2017089145 A1 * 6/2017 ............... B07C 5/34

OTHER PUBLICATIONS

International Search Report dated Apr. 14, 2020 in PCT/EP2020/051246 filed on Jan. 20, 2020, 3 pages.
(Continued)

*Primary Examiner* — Gene O Crawford
*Assistant Examiner* — Muhammad Awais
(74) *Attorney, Agent, or Firm* — Oblon, McClelland, Maier & Neustadt, L.L.P.

(57) ABSTRACT

A system for recycling planar objects including compressed mineral fiber material includes: a conveyor arranged to covey the planar objects through a number of stations at least including a thickness measurement station and a sound measurement station. The sound measurement station includes a sound reflecting surface arranged to back a first major surface of a planar object, a sound emitter arranged to emit sound towards the sound reflecting surface, a sound receiver arranged to receive sound reflected from the sound reflecting surface, and a converter arranged to determine a property related to sound absorption. A sorting station is
(Continued)

arranged to sort the planar objects based on determined properties in to a plurality of fractions.

16 Claims, 6 Drawing Sheets

(51) Int. Cl.
  *G06T 7/60* (2017.01)
  *H04R 1/02* (2006.01)
  *H04R 1/08* (2006.01)
  *H04R 3/00* (2006.01)
(52) U.S. Cl.
  CPC ............... *H04R 1/08* (2013.01); *H04R 3/00* (2013.01); *B07C 2501/0027* (2013.01)
(58) Field of Classification Search
  USPC ........................................................ 209/555
  See application file for complete search history.

(56) References Cited

U.S. PATENT DOCUMENTS

| | | | | |
|---|---|---|---|---|
| 5,639,503 | A * | 6/1997 | Mochizuki | B07C 5/34 426/632 |
| 8,083,066 | B2 * | 12/2011 | Bourely | B07C 5/34 209/939 |
| 2006/0163397 | A1 * | 7/2006 | Baker | B07C 5/122 241/101.2 |
| 2008/0245873 | A1 * | 10/2008 | Dwinell | G06T 7/60 235/462.41 |
| 2015/0122705 | A1 * | 5/2015 | Latti | G01N 33/24 209/555 |

OTHER PUBLICATIONS

Office Action dated Jan. 12, 2023, in corresponding Canadian Patent Application No. 3,123,722, 3 pages.

* cited by examiner

SYSTEM AND METHOD FOR RECYCLING PLANAR OBJECTS

FIELD OF THE INVENTION

The present invention generally relates to a system for recycling planar objects and to a method for recycling planar objects.

BACKGROUND OF THE INVENTION

Environmental concern is an ever increasing driver in modern society. To be able to recycle material and to reuse the material may significantly reduce the environmental impact when producing a new product. The recycled material is commonly used as it is or is reshaped to form part of a new product or similar.

In order to be able to efficiently reuse used material when producing new products, the used material must fulfil certain requirements in order to not negatively affect the quality of the product being produced. For instance, it generally has to be concluded that the recycled material actually is the intended material and that the material in question fulfils certain property related requirements.

When recycling used material, it is therefore generally important to qualify the material to be reused in terms of material properties. The material properties of interest may vary greatly depending on the application at hand.

In the course of reducing the environmental impact, it has been suggested to recycle articles of compressed mineral fiber material to a greater extent than what is typically done today. Typical examples of products including compressed mineral fiber material are sound absorbing elements used in office and residential spaces. Such sound absorbing elements may come in the form of ceiling tiles, baffles or wall panels to mention a few examples. Recycling of such compressed mineral fiber material is generally ineffective, troublesome and/or energy intensive.

When recycling compressed mineral fiber material, a common approach is to grind the mineral fiber material into small parts which may be used e.g. as filling material. The so produced ground material is typically used as a low grade filling material as a substitute to sand or gravel. Moreover, fractions of the ground material may be classified as unusable for different reason resulting in waste material that e.g. has to be finally wasted or deposited.

Further, in some cases the ground material is completely wasted and not reused at all.

Another common approach when recycling compressed mineral fiber material is to melt the mineral fiber material and to spin new fibers form the melted material. This process is energy intensive and hence requires a high energy input in order to be employed. This excessive energy use is unwanted due to increased costs and increased environmental impact. Further, the newly produced fibers will have to undergo further processes in order to actually become new products. These required further processes are both energy and time consuming.

SUMMARY OF THE INVENTION

In view of the above, it is an object of the present invention is to provide an improved system for recycling planar objects comprising compressed mineral fiber material and to provide an improved method for recycling planar objects comprising compressed mineral fiber material.

Another object is to provide such a system for recycling and such a method for recycling which are capable of recycling planar objects comprising compressed mineral fiber material to a greater extent.

Another object is to provide such a system for recycling and such a method for recycling which are capable of recycling planar objects comprising compressed mineral fiber material while resulting in less wasted material.

Another object is to provide such a system for recycling and such a method for recycling which are capable of recycling planar objects comprising compressed mineral fiber material where desired properties of the recycled material may be preserved, while other properties may be altered to suit e.g. a future use. For instance, sound absorbing properties of a ceiling tile may be preserved while its visual appearance is altered or improved e.g. by conditioning an outer surface of the ceiling tile.

Another object is to provide such a system for recycling and such a method for recycling which are capable of recycling planar objects comprising compressed mineral fiber material in a way requiring less additional processing of the recycled objects.

It is also an object to provide a cost effective system for recycling and a cost effective method for recycling.

To achieve at least one of the above objects and also other objects that will be evident from the following description, a system for recycling planar objects comprising compressed mineral fiber material having the features defined in claim 1 and a method for recycling planar objects comprising compressed mineral fiber material according to claim 15 are provided according to the present inventive concept. Preferred variations to the inventive concept will be evident from the dependent claims.

More specifically, according to a first aspect, there is provided a system for recycling planar objects having a first major surface and an opposing, second major surface, the planar object comprising compressed mineral fiber material, the system comprising: a conveyor arranged to sequentially covey the planar objects one by one through a number of stations along a conveyor direction, the number of stations at least comprising: a thickness measurement station arranged to determine a property related to thickness and associated to each of the planar objects being conveyed through the thickness measurement station, a sound measurement station arranged to determine a property related to sound absorption and associated to each of the planar objects being conveyed through the sound measurement station, the sound measurement station comprising, a sound reflecting surface arranged to back the first major surface of each planar object being conveyed through the sound measurement station, a sound emitter arranged to emit sound towards the sound reflecting surface, a sound receiver arranged to receive sound reflected from the sound reflecting surface, and a converter arranged to determine the property related to sound absorption based on the emitted sound and the reflected sound, and a sorting station arranged to sort the planar objects based on their respective determined properties in to a plurality of fractions.

Hereby an improved system for recycling planar objects comprising compressed mineral fiber material is provided.

The planar objects being recycled by the system are having a first major surface and an opposing, second major surface and comprises compressed mineral fiber material. In other words, the planar objects, each typically has front side in form of the first major surface and a back side in form of the second major surface. Examples of compressed mineral fiber materials are compressed glass fiber materials and compressed rock fiber materials.

The system comprises a conveyor arranged to sequentially covey the planar objects one by one through a number of stations along a conveyor direction.

The conveyor may be a standard type conveyor or may be a purpose made conveyor designed specifically for the subject system. The conveyor may for instance include a conveyor belt or a plurality of conveyor belts used to convey the planar objects. Other suitable examples include roll conveyors and slide conveyors. A slide conveyor is typically employed with a driver. As an alternative, the planar object may be temporarily held by a holding arrangement which may be conveyed by a conveyor. Examples of holding arrangements include a clamping mechanism, a basket and a suction cup. The stations are consequently arranged such that the planar objects are conveyed through the stations while being conveyed by the conveyor.

The stations include at least a thickness measurement station, a sound measurement station and a sorting station.

The thickness measurement station is arranged to determine a property related to thickness and associated to each of the planar objects being conveyed through the thickness measurement station. In practice, the property related to thickness may be the actual thickness of a planar object in a single point or mean thickness deriving from a plurality of thickness measurements taken at different locations at a planar object. Further, the property related to thickness may be in the form of a matrix where each value representing a thickness of a planar object in a unique separate spatial location. In other words, the property related to thickness may represent a thickness map. The property related to thickness may be the actual physical thickness or may be an arbitrary number representing the thickness or a thickness interval.

The sound measurement station is arranged to determine a property related to sound absorption and associated to each of the planar objects being conveyed through the sound measurement station. The sound measurement station comprises a sound reflecting surface, a sound emitter, a sound receiver and a converter.

The sound reflecting surface is arranged to back the first major surface of each planar object being conveyed through the sound measurement station. The sound reflecting surface is a surface of a solid material capable of reflecting a sound impinging on the surface. In other words, the sound reflecting surface is constituted that a portion of the energy of a sound impinging on the sound reflecting surface will be reflected by the sound reflecting surface. The sound reflecting surface may be the surface of a board or plate, such as a metal plate, a plastic board, wooden board or a composite board. Other types of material bodies or surface materials may be equally suitable.

The sound reflecting surface may back the first major surface of each planar object being conveyed through the sound measurement station directly or indirectly. This means that the first major surface of the planar objects may come into direct contact with the sound reflecting surface or that the first major surface of the planar objects may not come into direct contact with the sound reflecting surface. In the latter case, the he first major surface of each planar object being conveyed through the sound measurement station will still be backed by the sound reflecting surface, but there may be other objects present between the first major surface and the sound reflecting surface. For instance, a conveyor belt, a holding mechanism or a conveyor basked of the conveyor may be present between the first major surface and the sound reflecting surface. Preferably, void spaces such as air pockets or similar are to be avoided between the first major surface and the sound reflecting surface, as such void spaces my influence the determination of the property related to sound absorption and associated to each of the planar objects.

The sound emitter is arranged to emit sound towards the sound reflecting surface. The sound emitter may be of any suitable kind such as a loudspeaker, a tweeter, a piezoelectric driver or similar. The sound emitter may be configured to emit sound having different properties, such as sound representing a sinusoidal signal, a linear sweep, an exponential sweep, a maximum length sequence (MLS), a white noise or a pink noise. The sound emitter may be arranged to emit sound towards the sound reflecting surface at an oblique angle or in a normal direction thereto.

The sound receiver is arranged to receive sound reflected from the sound reflecting surface. The sound receiver may be of any suitable kind such as a microphone, a particle velocity sensor or a combination thereof. The sound receiver may include a plurality of actuators for measuring different sound properties. A single actuator may be used to measure different sound properties. The sound receiver is preferably arranged at or in proximity to the surface of the planar object to be measured. Other locations of the sound receiver may also be used to advantage.

The converter is arranged to determine the property related to sound absorption based on the emitted sound and the reflected sound. The converter may be of any suitable kind. As an example, the converter may include processing capabilities configured to compare signals pertaining to the emitted sound and the reflected sound respectively. Information related to the emitted sound may be based on an actual measurement or may be based on information pertaining to the sound being emitted by the sound emitter. In other words, the emitted sound may be measured by e.g. a microphone or the converter may receive a signal indicative of the properties of the sound emitted by the sound emitter.

Typically, the converter compares a signal pertaining to at least one property of emitted sound with a signal pertaining to corresponding property of the reflected sound. Based on e.g. a ratio between the signals, the property related to sound absorption may be determined. Relevant properties include, sound pressure, particle velocity and sound intensity. Also measured properties related to thickness of an object may be taken into account when determining the property related to sound absorption. Further, distances between the sound emitter, the sound receiver and an object may also be taken into account when determining the property related to sound absorption. The property related to sound absorption may be determined based on measured acoustic signals. The property related to sound absorption may include surface impedance, sound reflection and sound absorption.

The sorting station is arranged to sort the planar objects based on their respective determined properties in to a plurality of fractions. The sorting station is thus arranged to physically sort the planar objects based on the properties determined by the other stations of the system. In practice, as described above, at least a property related to thickness and a property related to sound absorption is determined by the stations of the system. The system may include further stations arranged to determine further properties. The sorting station may sort the planar object based on individual determined properties or based on a combination of properties. For instance, the planar object may be sorted based on their thicknesses or based on their sound absorption properties. Further, the planar object may be sorted based on their thicknesses and their sound absorption properties. The sorting station typically include means for mechanical handling of the planar objects, such that the planar objects being sorted may be physically sorted by being placed at different locations or by being conveyed to different locations.

By the present system the acoustic properties of the planar object may be preserved since the planar objects may be sorted based on the property related to sound absorption and associated to each of the planar objects. In other words, fractions of the planar objects fulfilling certain acoustic properties may be reused in a way where the sound absorbing properties of the planar object are preserved. In fact, the acoustic properties of the planar objects may be preserved even if the planar objects being sorted are dirty, broken, discolored, damp or similar. This is due to the fact that the sound absorbing properties of the planar objects are normally not affected much although the planar objects as such may be heavily worn for various reasons.

The thickness measurement station may comprise a camera based thickness measurement system arranged to determine the property related to thickness and associated to each of the planar objects. By utilizing a camera based thickness measurement system, the thickness may be measured with high accuracy in a robust way. In practice, a digital image of an edge region of a planar object may be acquired. From the digital image, the thickness of the planar object may be determined by image analysis. The image may be acquired at an arbitrary angle as long as an edge region of the planar object is visible in the acquired image. By acquiring a digital image at an oblige angle, other portions of the planar than an edge region may be observable in the image.

A further advantage with utilizing a camera based thickness measurement system is that digital images acquired by the camera based thickness measurement system may be further analyzed to determine other properties of the planar object. For instance, the color, the length or the width of the planar object may be determined. in other words, the camera based thickness measurement system of the thickness measurement station may enable that the thickness measurement station functions as a combined measurement station for measuring more than one property of a planar object.

The thickness measurement station may comprise a thickness laser gauge arranged to determine the property related to thickness and associated to each of the planar objects, which is advantageous in that property related to thickness may be determined in an accurate and reliably manner.

The sound receiver of the sound measurement station may be arranged to measure particle velocity and sound pressure of the received sound, which is advantageous in that the sound absorption and the reflection coefficient of the planar object at hand may be obtained. The sound absorption and the reflection coefficient may be obtained directly from the measured particle velocity and sound pressure as the complex ratio of the measured sound pressure and the particle velocity.

The conveyor may be arranged to continuously convey the planar objects one by one through the number of stations, which is advantageous in that a continuous flow of planar objects to the system may be realized. In this way a high throughput system with large capacity may be realized. In practice, certain measurements carried out by the respective measurement stations may have to be adapted to the speed of which the planar objects are conveyed through the number of stations. For instance, the sound measurement station may have to account for the movement of the planar object being measured. Such a compensation may typically be performed in the converter of the sound measurement station. Similarly, the sorting station will have to account for and be able to handle the movement of the planar object being sorted.

The conveyor may be arranged to intermittently convey the planar objects one by one through the number of stations, which is advantageous in that simplified measurements may be conducted as no movement of the planar object at hand will have to be compensated for. In practice, the planar object being measured at may be temporarily stopped while measurements are carried out. The plurality of stations may be arranged in synchronization, such that a respective planar object is measured at in each station at the same time, i.e. during a temporary stop. As an alternative, a plurality of stations may measure at the same planar object during a temporary stop.

The conveyor may be arranged to convey the planar objects in an upright position or in a lying position. By conveying the planar objects in an upright position, a more compact system may be achieved. At the same time sorting of the planar objects may be effectuated by letting the planar objects drop down form the conveyor into a set of openings or slits corresponding to different fractions of the planar object being sorted.

By conveying the planar objects in a lying position, sorting may be effected by transferring the planar objects to different locations or by lifting the planar objects into different fractions in the sorting station.

The system may further comprise a length measurement station arranged to determine a property related to length and associated to each of the planar objects being conveyed through the length measurement station, which is advantageous in that the subsequent sorting at the sorting station, sorting the planar object into a plurality of fractions may, also be based on the property related to length. The property related to length may for example be the length of the planar object at hand or may be an arbitrary number representing a length or a length interval. The property related to length may be determined by any suitable measurement device. For instance, a camera based measurement system may be used.

The system further may comprise a width measurement station arranged to determine a property related to width and associated to each of the planar objects being conveyed through the width measurement station, which is advantageous in that the subsequent sorting at the sorting station, sorting the planar object into a plurality of fractions may, also be based on the property related to width. The property related to width may for example be the width of the planar object at hand or may be an arbitrary number representing a width or a width interval. The property related to width may be determined by any suitable measurement device. For instance, a camera based measurement system may be used.

The system may further comprise a weight measurement station arranged to determine a property related to weight associated to each of the planar objects being conveyed through the weight measurement station, which is advantageous in that the subsequent sorting at the sorting station, sorting the planar object into a plurality of fractions may, also be based on the property related to weight. The property related to weight may for example be the actual weight of the planar object at hand or may be an arbitrary number representing a weight or a weight interval. The property related to weight may be determined by any suitable measurement device. For instance, a scale or a balance may be used. Moreover, by measuring the weight of a planar object in combination with length and width, the density of the planar object may be determined.

The system may further comprise a fiber type measurement station arranged to determine a property related to fiber type and associated to each of the planar objects being conveyed through the fiber type measurement station, which is advantageous in that the subsequent sorting at the sorting station, sorting the planar object into a plurality of fractions may, also be based on the property related to fiber type. The property related to fiber type may for example be the actual fiber type of the planar object at hand or may be an arbitrary number representing a fiber type or a group of fiber types. The property related to fiber type may be determined by any suitable measurement device. For instance, a camera based measurement system may be used. In practice, conclusions regarding the fiber type may for instance be drawn from a color of the planar object at hand.

The system may further comprise a binder type measurement station arranged to determine a property related to binder type and associated to each of the planar objects being conveyed through the binder type measurement station, which is advantageous in that the subsequent sorting at the sorting station, sorting the planar object into a plurality of fractions, may also be based on the property related to binder type. The property related to binder type may for example be the actual binder type of the planar object at hand or may be an arbitrary number representing a binder type or a group of binder types. The property related to binder type may be determined by any suitable measurement device. For instance, a camera based measurement system may be used. In practice, conclusions regarding the binder type may for instance be drawn from a UV or NIR measurement at the planar object at hand.

The system may further comprise a surface layer detection station arranged to determine a property related to presence of a surface layer and associated to each of the planar objects being conveyed through the surface layer detection station, which is advantageous in that the subsequent sorting at the sorting station, sorting the planar object into a plurality of fractions may, also be based on the property related to presence of a surface layer. The property related to presence of a surface layer may for example be a digital signal having a high value in case of a surface layer and a low value in case of no surface layer or vice versa. The property related to presence of a surface layer may be determined by any suitable measurement device. For instance, a camera based measurement system may be used. In practice, conclusions regarding the presence of a surface layer may for instance be drawn from a color or a surface homogeneity of the planar object at hand.

The system may further comprise a humidity level measurement station arranged to determine a property related to humidity level and associated to each of the planar objects being conveyed through the humidity level measurement station, which is advantageous in that the subsequent sorting at the sorting station, sorting the planar object into a plurality of fractions may, also be based on the property related to humidity level. The property related to humidity level may for example be the humidity level of the planar object at hand or may be an arbitrary number representing a humidity level or a humidity level interval. The property related to humidity level may be determined by any suitable measurement device. For instance, an IR-sensor, temperature sensor or capacitance sensor may be used.

According to another aspect of the invention, there is provided a method for recycling planar objects having a first major surface and an opposing, second major surface, the planar object comprising compressed mineral fiber material, the method comprising: sequentially conveying the planar objects one by one through a number of stations along a conveyor direction to determine a number of properties, determining a property related to thickness and associated to each of the planar objects using a thickness measurement station while conveying each of the planar objects through the thickness measurement station, determining a property related to sound absorption and associated to each of the planar objects using a sound measurement station while conveying each of the planar objects through the sound measurement station, wherein determining the property related to sound absorption comprises; backing the first major surface of a planar object being conveyed through the sound measurement station on a sound reflecting surface, emitting sound towards the sound reflective surface, such that the emitted sound enters the planar object at the second major surface and propagates through the planar object to the sound reflective surface, receiving sound exiting the second major surface of the planar object and being reflected by the sound reflecting surface, and determining the property related to sound absorption based on the emitted sound and the received sound, and sorting the planar objects based on their respective determined properties in to a plurality of fractions using a sorting station, wherein at least one of the plurality of fractions is used for assembling planar objects comprising compressed mineral fiber material.

The details and advantages of this aspect of the invention are largely analogous to those of the first aspect of the invention, wherein reference is made to the above.

However, according to this aspect at least one of the plurality of fractions is used for assembling planar objects comprising compressed mineral fiber material. In this way a new product exhibiting a desired property or desired properties may be formed from the planar objects being recycled.

The method may further comprises determining at least one of: a property related to length, a property related to width, a property related to fiber type, a property related to binder type, a property related to presence of a surface layer and a property related to humidity level, wherein the at least one determined property is associated to each of the planar objects Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise.

BRIEF DESCRIPTION OF THE DRAWINGS

The above, as well as additional objects, features and advantages of the present invention, will be better understood through the following illustrative and non-limiting detailed description of preferred variants of the present inventive concept, with reference to the appended drawings, where the same reference numerals will be used for similar elements, wherein.

DETAILED DESCRIPTION

The present inventive concept will now be described more fully hereinafter with reference to the accompanying drawings, in which preferred variants of the inventive concept are shown. This inventive concept may, however, be embodied in many different forms and should not be construed as limited to the variants set forth herein; rather, these variants are provided for thoroughness and completeness, and fully convey the scope of the inventive concept to the skilled person. Like reference numerals refer to like elements throughout the description.

Initially a system 100 for recycling planar objects 102 will be described with reference to FIGS. 1-3. An alternate sorting station 116 which may be employed in the system 100 will be described with reference to FIG. 4. Following the description of the system 100, an alternate configuration of the system 100, in which the planar objects are conveyed in an upright position, will be described with reference to FIG. 5. Finally, a method 300 for recycling planar objects 102 will be described with reference to FIG. 6.

Figure 1:
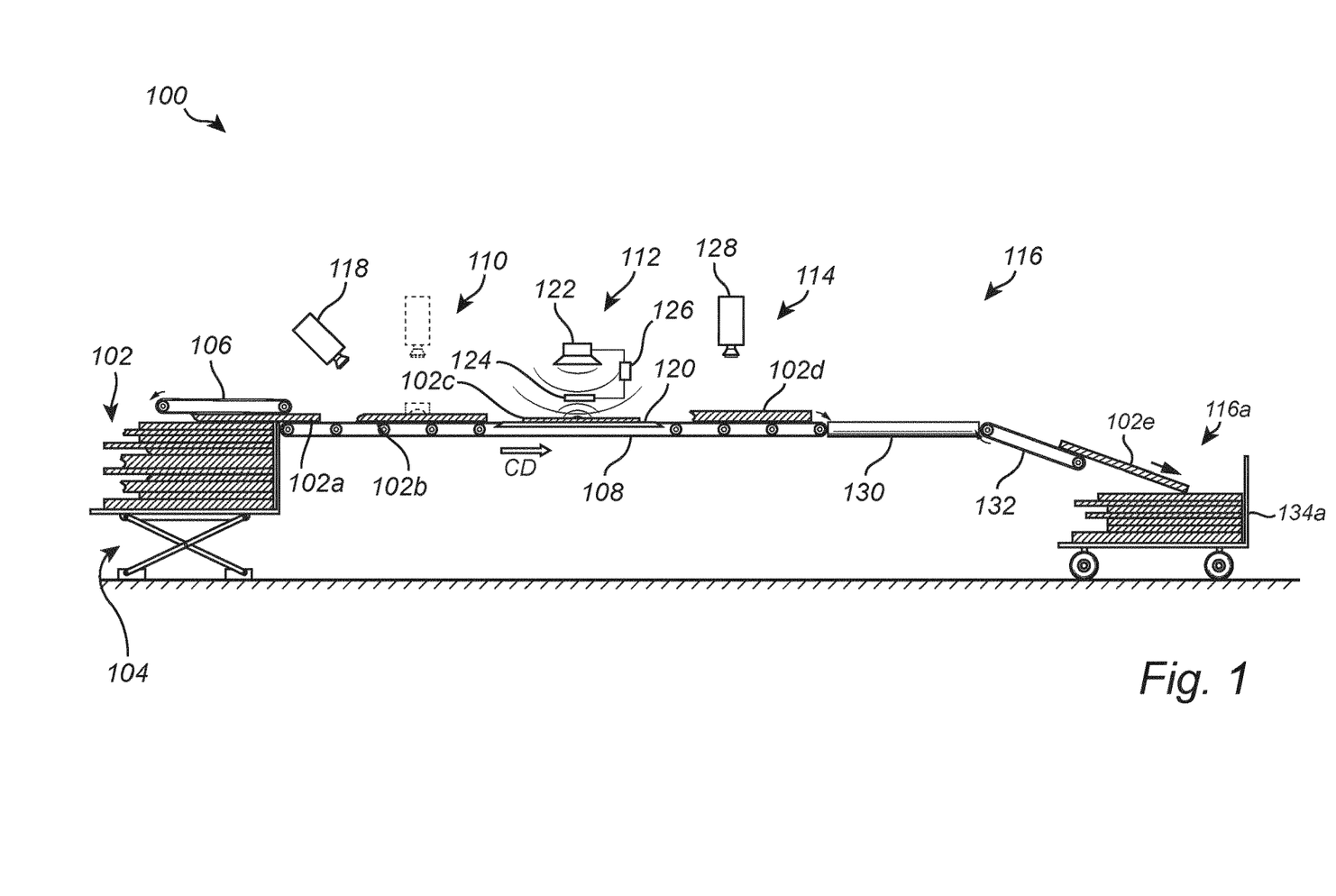
FIG. 1 conceptually illustrates, in a side view, a system for recycling planar objects where the objects are conveyed in a lying fashion.
Figure 2:
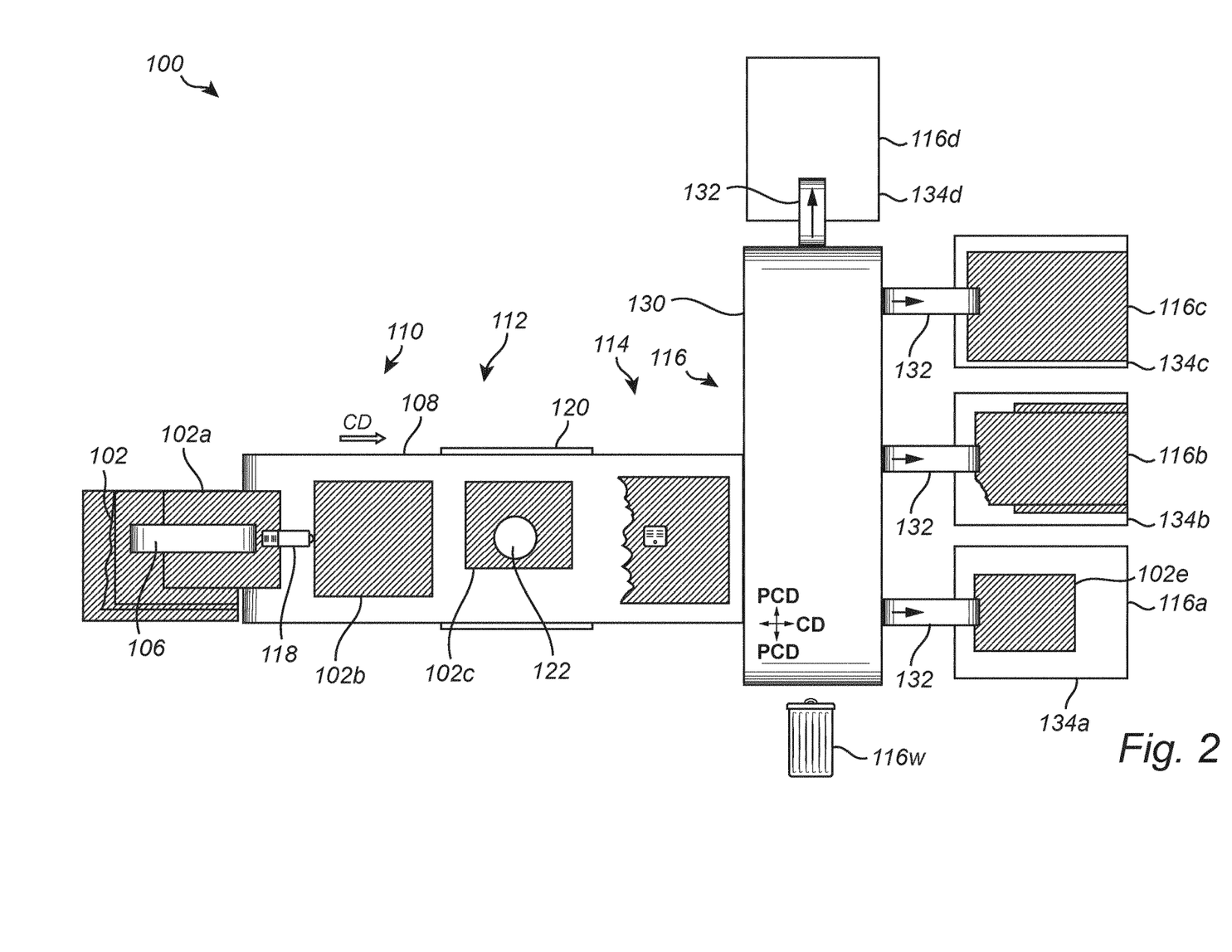
FIG. 2 is a top view of the system in FIG. 1.

Now referring to FIGS. 1 and 2, here is conceptually depicted a system 100 for recycling planar objects 102. FIG. 1 illustrates the system 100 in a side view, whereas FIG. 2 illustrates the system 100 in a top view. The system 100 is designed to recycle the planar objects 102 by sorting the planar object 102 into a plurality of fractions. The planar objects 102 comprise compressed mineral fiber material. The depicted planar objects 102 are ceiling tiles which are to be recycled. The system 100 is equally usable for recycling other planar objects 102, such as sound absorbing elements in form of wall panels or baffles to give a few non-limiting examples. Each planar object 102 having a first major surface and an opposing, second major surface. Further, each planar object 102 typically has four side edge surfaces extending between the respective first and second major surfaces. However, the planar objects 102 may have any number of side edges depending on e.g. the shape of the planar objects 102 at hand. As depicted in FIGS. 1 and 2, the planar objects 102 are typically of different size and do also typically have different thicknesses. Further, the planar objects 102 may have different shapes owing from several reasons. The planar objects 102 may be shaped differently or may be damaged, such that the damage results in a different shape.

In the depicted system 100 the planar objects 102, that are to be recycled, are provided in a stacked manner as shown at the left hand side in FIGS. 1 and 2. The planar objects 102 may however come in any form and may for instance be picked one after another from a pile of planar elements 102 where the planar elements 102 are piled in a non-ordered or random fashion.

The stacked planar elements 102 in FIGS. 1 and 2 are stacked on a planar surface provided on a scissor lift 104. The scissor lift 104 lifts the stacked planar objects 102 such that the uppermost planar object 102a is brought into contact with conveyor 106. Conveyor 106 then pulls the uppermost planar object 102a of the stack of planar objects 102 and feeds the uppermost planar object 102a onto the conveyor 108. The conveyor 108 conveys planar objects 102 in a conveying direction CD indicated by an arrow in FIGS. 1 and 2. The conveyor 108 conveys the planar objects, one by one through a number a number of stations 110, 112, 114 and 116 along the conveying direction CD. In the depicted system 100, four planar objects 102 are presently on the conveyor 108, namely the planar objects, 102a-d. Planar object 102a is entering the conveyor, planar object 102b is depicted while in station 110, planar object 102c is depicted while in station 112 and planar object 102d is depicted while in station 114. As is clearly shown in FIGS. 1 and 2, the planar objects 120a-d are off different sizes, shapes and thicknesses. Planar object 102d is damaged at its trailing edge as seen in the conveying direction CD.

Station 110 is a thickness measurement station 110 and is arranged to determine a property related to thickness and associated to each of the planar objects 102 being conveyed through the thickness measurement station 110. Typically, the actual thickness of the planar object 102b, presently in the thickness measurement station 110, is determined. In the depicted thickness measurement station 110 a camera based thickness measurement system 118 is used to determine the thickness of the planar object 102b. In practice, a digital image is acquired of an edge region of the planar object 102b by a digital camera of the camera based thickness measurement system 118. The thickness of the planar object is then determined by image analysis as is known in the art. As an alternative to a camera based thickness measurement system 118, a laser gauge arranged to determine the property related to thickness and associated to each of the planar objects 102 may be used. The planar object 102b is subsequently conveyed further along the conveying direction CD and is next entering station 112.

In the depicted system 100 of FIGS. 1 and 2, the planar object 102c is presently in station 112. Station 112 is a sound measurement station 112 arranged to determine a property related to sound absorption and associated to each of the planar objects 102 being conveyed through the sound measurement station 112. The sound measurement station 112 comprises a sound reflecting surface 120. The sound reflecting surface 120 is arranged to back a first major surface, i.e. the downward facing surface, of each planar object 102 being conveyed through the sound measurement station 112. The depicted reflecting surface 120 is an upper surface of a solid board arranged under the conveyor belt of conveyor 108.

Figure 3:
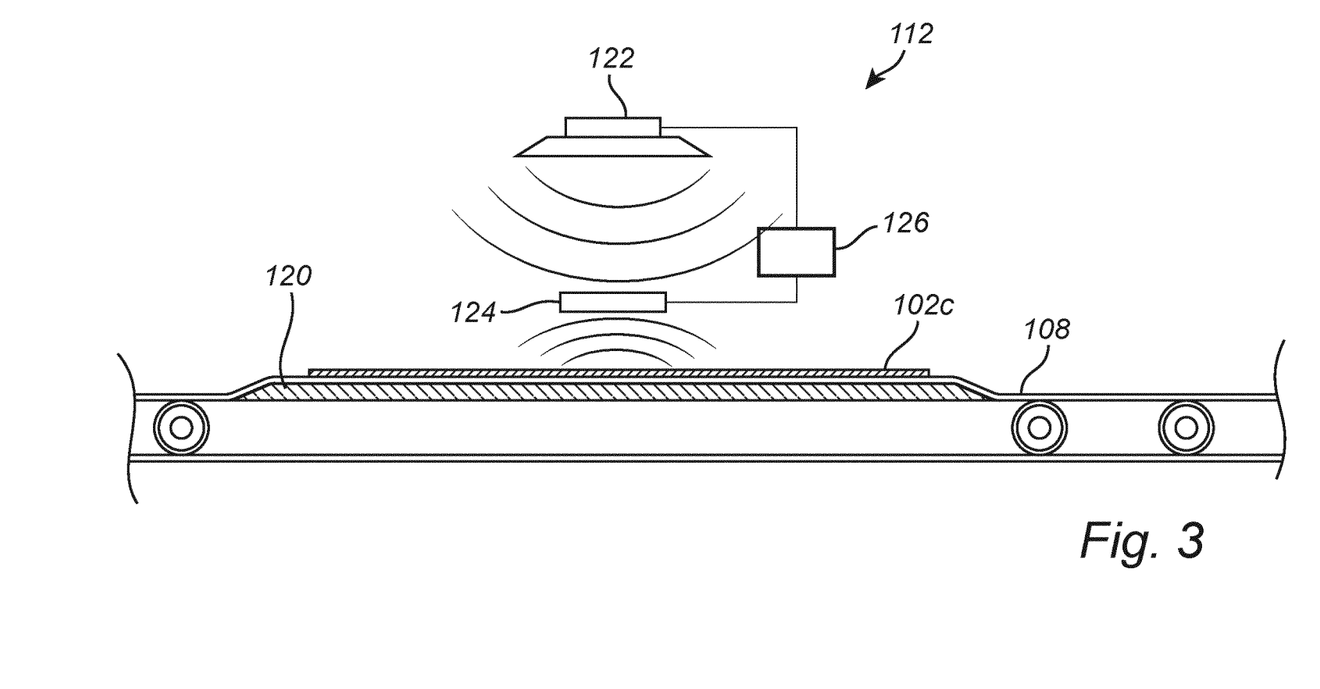
FIG. 3 is a detail view of the sound measurement station of FIGS. 1 and 2.

Now also referring to FIG. 3, here the sound measurement station 112 of FIGS. 1 and 2 is shown in greater detail. As can be seen in FIG. 3, the conveyor belt of the conveyor 108 is slightly raised and tensioned while passing the sound reflecting surface 120. This in order to provide a distinct mechanical contact between the conveyor belt and the sound reflecting surface 120. By providing a distinct mechanical contact between the conveyor belt and the sound reflecting surface 120 the risk of erroneous sound measurements emanating from air pockets or similar may be significantly reduced.

The sound measurement station 112 comprises a sound emitter 122 arranged to emit sound towards the sound reflecting surface 120, a sound receiver 124 arranged to receive sound reflected from the sound reflecting surface 120, and a converter 126 arranged to determine the property related to sound absorption based on the emitted sound and the reflected sound.

The depicted sound emitter 122 is a loudspeaker which is provided to emit sounds at a normal angle to the sound reflecting surface 120. However, other angels other than a normal angle may be used to advantage. The sound receiver 124 is arranged above the sound reflecting surface 120 and is facing the same. The sound receiver 124 will consequently receive sound which has been reflected by sound reflecting surface 120. In the depicted system 100, the sound receiver 124 is provided closer to the sound reflecting surface 120 than the sound emitter 122. However, the respective distances and interrelation may vary.

The depicted sound receiver 124 is arranged to measure particle velocity and sound pressure of the received sound. For this reason, the depicted sound receiver 124 includes a microphone and a particle velocity sensor. An example of a combined particle velocity and sound pressure sensor is a PU sensor from Microflown™ Technologies. The PU sensor may be a broadband PU probe with a measurement interval of 20 Hz to 10 kHz and including a particle velocity sensor and a microphone. However, the sound receiver 124 may include a single sensor, such as a microphone or a plurality of sensors. For instance, array techniques consisting of several microphones measuring over a predefine volume above the planar object may also be used to advantage. Moreover, a programmable robot measuring over a predefined volume may be used to advantage.

The sound emitter 122 and the sound receiver 124 are both coupled to the converter 126 which is used to determine the property related to sound absorption based on the emitted sound and the reflected sound. In the depicted system 100, the converter 126 is adapted to determine the absorption of the planar object 102c presently in the sound measurement station 112 based on the emitted sound and the reflected sound. For this purpose, the sound emitter transmits a signal representing the transmitted sound to the converter 126, such that the converter 126 possesses information related to the emitted sound. As an alternative, the emitted sound may be measured by e.g. the sound receiver 124 or by an additional microphone or similar.

Further, the sound receiver 124 measures sound which has been reflected by the sound reflecting surface 120. In practice, sound is emitted from the sound emitter through the planar object 102c onto the sound reflecting surface 120, which reflects at least a portion of the received sound back through the planar object 102c and further to the sound receiver 124, which measures the received reflected sound. As previously stated, the depicted sound receiver 124, measures particle velocity and sound pressure of the received i.e. reflected sound. The sound receiver 124 transmits a signal related to the measured particle velocity and sound pressure to the converter 126. The converter 126 then determines the sound absorption based on the respective signals, i.e. the signals representing the transmitted sound and the signal related to particle velocity and sound pressure of the received sound. For instance, the sound absorption coefficient may be determined from the transmitted sound and the received sound. The sound absorption coefficient is the fraction of sound energy absorbed by a material. The sound absorption coefficient is expressed as a value between 1.0 and 0, where 1 is perfect absorption, i.e. no reflection, and zero is no absorption, i.e. total reflection. The sound absorption coefficient varies with frequency and angle of incidence and is generally determined experimentally using sound field reconstruction techniques, such as described in PhD thesis "Experimental characterization of the sound field in a reverberation room" by M. Nolan (Department of Electrical Engineering, DTU, Denmark, 2018). Sound absorption properties, such as the sound absorption coefficient, of the planar object 102c may be determined from the following known equation, $I = \frac{1}{2} \text{Re}\{p\ u^*\}$, $J_r \frac{1}{2} \text{Im}\{p\ u^*\}$, where p is sound pressure, u is particle velocity, I and J are active and reactive intensity respectively. In practice, the intensity of the emitted sound from the sound emitter 122 is then compared with intensity of the received sound, as calculated according to above form the measured sound pressure and particle velocity. Based on this comparison, the sound absorption coefficient may consequently be determined by the converter 126.

The planar object 102c is subsequently conveyed further along the conveying direction CD and is next entering station 114. Station 114 is a combined measurement station in which a plurality of properties of the planar objects 102 are determined. In other words, a plurality of properties of the planar object 102c may be determined while the planar object 102c is in station 114.

The station 114 is optional and the system 100 may be used to advantage without the station 114. In practice, functionality of station 114 may advantageously be integrated in or combined with the functionality of the stations 110 and/or 112. In fact, also stations 110 and 112 may be combined so as to measure on the same planar object at the same instant in time. For instance, station 110 may include further camera based systems arranged at different angles as shown in phantom in FIG. 1. Further, station 114 may measure a plurality of properties or just a single property. Furthermore, station 114 may measure any of the below described properties in any combinations. As sated, the station 114 is a combined measurement station which may be used to measure a plurality of properties of the planar objects 102. In practice, station 114 may include a camera based measurement system 128. A camera of the camera based measurement system 128 may thus acquire an image of the planar object 102d presently in station 114. From the acquired image, a plurality of properties may be determined.

For instance, the length of the planar object 102d may be determined from the acquired image. This means that the station 114 may act as a length measurement station 114.

Further, the width of the planar object 102d may be determined from the acquired image. This means that the station 114 may act as a width measurement station 114.

Further, the fiber type of the planar object 102d may be determined from the acquired image. This means that the station 114 may act as a fiber type measurement station 114.

Further, the binder type of the planar object 102d may be determined from the acquired image. This means that the station 114 may act as a binder type measurement station 114.

Further the presence of a surface layer of the planar object 102d may be determined from the acquired image. This means that the station 114 may act as a surface layer detection station 114.

Similarly, the camera based thickness measurement system 118 of station 110 may be used to determine the above properties, meaning that also the station 110 may be configured as a combined measurement station 110.

The station 114 may also include other types of sensors, such as UV, NIR, IR, temperature, capacitance or weight sensors. UV or NIR sensors may be for instance used to advantage when it comes determining the property related to binder type, whereas IR, temperature or capacitance sensors may be used to advantage when it comes to determine humidity level. Hence, the station 114 may act as a humidity level measurement station 114. Further, the weight of the planar object 102d or a property related to weight of the planar object 102d may be determined in the station 114 by employing the station 114 with a weight sensor, e.g. in form of a scale or balance.

The planar object 102d is subsequently conveyed further along the conveying direction CD and is next entering station 116. Station 116 is a sorting station 116 arranged to sort the planar objects 102 based on their respective determined properties in to a plurality of fractions 116a-d, 116w.

From the conveyor 108, the planar objects are conveyed onto the multidirectional conveyor 130 which is adapted to convey planar objects 102 along the conveyor direction CD and directions PCD which are perpendicular to the conveyor direction CD. The multidirectional conveyor 130 is adapted to convey the planar objects to a plurality of locations 116a-d, 116w corresponding to a plurality of fractions 116a-d, 116w. When a planar object 102 is conveyed to one of the locations 116a-d, linear conveyor 132 pulls the planar object 102 at hand into the location 116a-d at hand. In FIGS. 1 and 2 it is depicted how planar object 102e is being pulled into location 116a. The sorting station 116 is configured to sort the planar objects 102 into a plurality of fractions based on the properties determined in the stations 110, 112 and 114. In the depicted system 100 the planar objects are sorted in into five fractions 116a-d, 116w and are conveyed into corresponding locations 116a-d, 116w. The fractions 116a-d are stacked on carts 134a-d, whereas fraction 116w is wasted and hence transported to a garbage can, container or similar.

The sorting station may be configured to sort the planar objects based on one, a plurality or all properties determined in the stations 110, 112 and 114. Generally, the property related to thickness and the property related to sound absorption are considered when sorting the planar objects 102 into the plurality of fractions 116a-d, 116w. In this way planar objects 102 having a similar thickness and similar sound absorbing properties may be sorted into the same fraction, e.g. fraction 116a.

Figure 4:
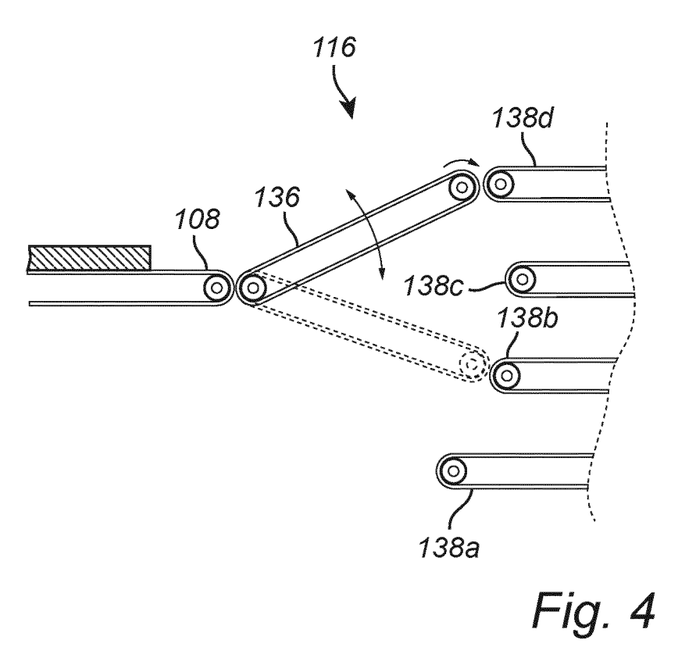
FIG. 4 is detail view of an alternative sorting station which may be employed in the system of FIGS. 1 and 2.

The sorting station 116 of the system 100 may be constructed differently depending on the needs at hand. For instance, in some locations, the available floor space may be limited. In such case, the sorting station may as an alternative to the multidirectional conveyor 130 make use of the layout conceptually depicted in FIG. 4. In FIG. 4, the conveyor 108 conveys planar objects 102 onto a pivotable linear conveyor 136, which may be tilted so as to be able to convey the planar objects 102 further onto a number of linear conveyors 138a-d. According to this solution, the planar objects may be sorted into four fractions corresponding to the linear conveyors 138a-d.

In the above described system 100, the conveyor 108 may be arranged to continuously convey the planar objects 102 one by one through the number of stations 110, 112, 114, 116 or the conveyor may be arranged to intermittently convey the planar objects 102 one by one through the number of stations 110, 112, 114, 116. In case the planar objects 102 are conveyed continuously, the measurements of the respective stations 110, 112, 114 may be adapted to compensate for the movement of the conveyor.

Figure 5:
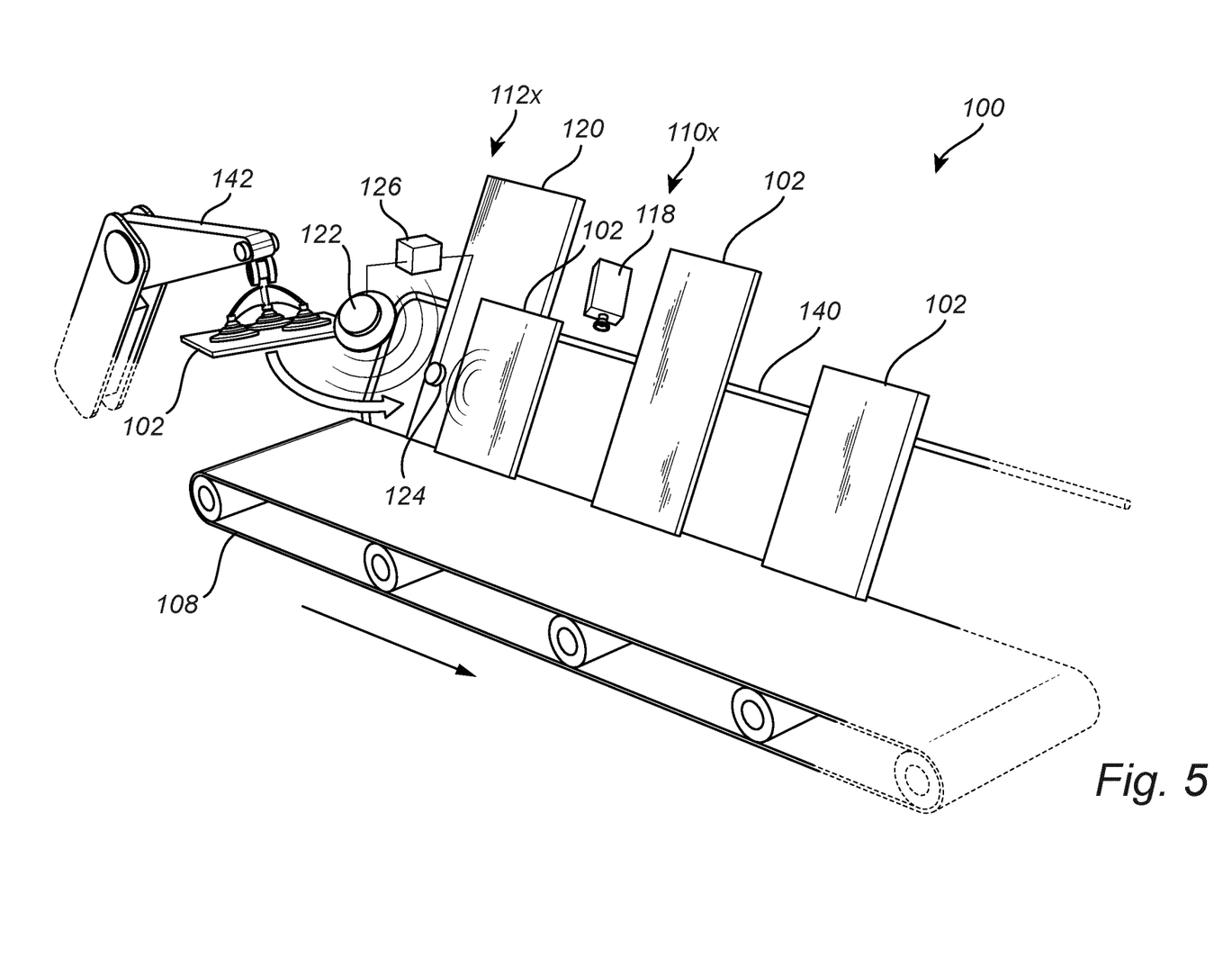
FIG. 5 conceptually illustrates, in a perspective view, a detail of a system for recycling planar objects where the objects are conveyed in an upright fashion.

Now turning to FIG. 5, here is conceptually depicted how the system 100 may be adapted to convey the planar objects 102 in an upright position instead of a lying position through a number of stations 110x, 112x. For reasons of simplicity, only two stations 110x, 112x are depicted in FIG. 5. Station 110x is a thickness measurement station 110x similar to the thickness measurement station 110 of FIGS. 1-2. Station 112x is a sound measurement station 112x similar to the sound measurement station 112 of FIGS. 1-3. For illustrative purposes, the sound measurement station 112x comes before the thickness measurement station 110x along the conveyor direction CD in FIG. 5. However, it is to be understood that it may be the other way around like in FIGS. 1 and 2.

In FIG. 5, the planar objects 102 are standing upright on conveyor 108 while resting against a rail 140. In contrast to FIGS. 1-2, the planar objects 102 are fed one by one to the conveyor 108 by means of an industrial robot 142. By this arrangement, the robot 142 may pick the planar objects one by one from for instance a pile of randomly arranged planar objects 102.

Since thickness measurement station 110x is similar to the thickness measurement station 110 of FIGS. 1-2, the thickness measurement station 110x will not be described in detail to avoid undue repetition. However, thickness measurement station 110x includes a camera based thickness measurement system 118 like thickness measurement station 110. The orientation of the camera based thickness measurement system 118 is altered to account for the upright position of the planar objects 102.

Since sound measurement station 112x is similar to the thickness sound measurement station 112 of FIGS. 1-3, the sound measurement station 112x will not be described in detail to avoid undue repetition. However, sound measurement station 112x comprises a sound reflecting surface 120, which in this case is an upright surface arranged to back the planar objects 102 being conveyed through the sound measurement station 112x. The sound measurement station 112x, just like the sound measurement station 112, also comprises a sound emitter 122 arranged to emit sound towards the sound reflecting surface 120, a sound receiver 124 arranged to receive sound reflected from the sound reflecting surface 120, and a converter 126 arranged to determine the property related to sound absorption based on the emitted sound and the reflected sound.

The system 100 of FIG. 5 may utilize the previously described sorting stations 116 of FIGS. 1-2 and 4. Alternatively, the system 100 of FIG. 5 may utilize gravity and sort the planar objects 102 in to a plurality of fractions by pushing them of the conveyor 108 at different locations corresponding to different fractions.

Figure 6:
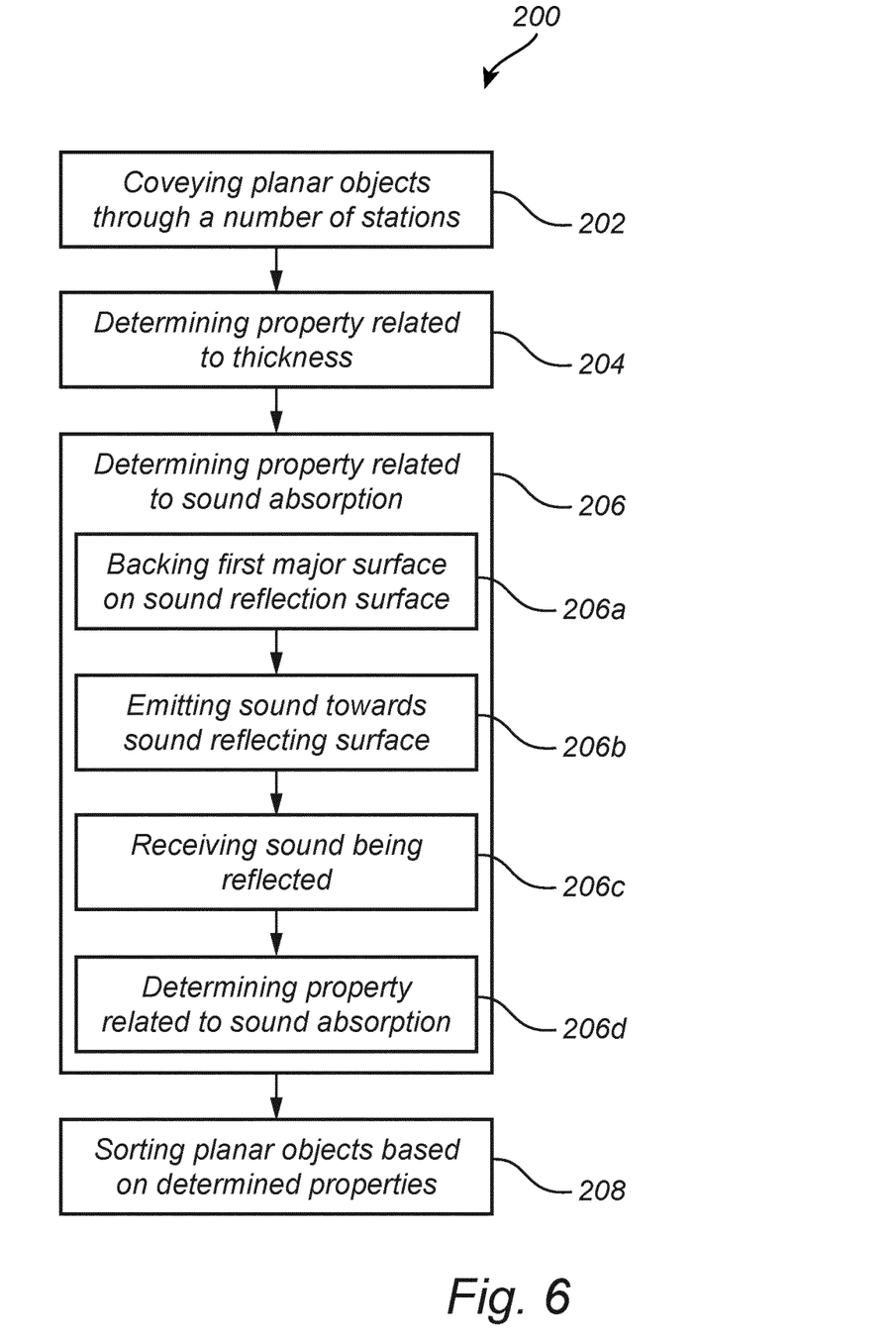
FIG. 6 is a flow chart of method for recycling planar objects.

A method 200 for recycling planar objects 102, 102a-e comprising compressed mineral fiber material will now be described with reference to FIG. 6.

In a first step 202 of the method 200, the planar objects 102, 102a-e are conveyed one by one through a number of stations 110, 110x, 112, 112x, 114, 116 along a conveyor direction CD. In practice, this first step 202 of the method 200 takes place throughout the execution of the method 200 since the planar objects the planar objects 102, 102a-e are conveyed one by one through a number of stations 110, 110x, 112, 112x, 114, 116 along the conveyor direction CD to determine a number of properties.

In a second step 204 of the method 200, a property related to thickness and associated to each of the planar objects 102, 102a-e is determined using a thickness measurement station 110, 110x while conveying each of the planar objects 102, 102a-e through the thickness measurement station 110, 110x.

In a third step 206 of the method 200, a property related to sound absorption and associated to each of the planar objects 102, 102a-e is determined using a sound measurement station 112, 112x while conveying each of the planar objects 102, 102a-e) through the sound measurement station 112, 112x. The third step 206 of determining the property related to sound absorption comprises four sub-steps 206a-d.

In the sub step 206a, the first major surface of a planar object 102, 102a-e being conveyed through the sound measurement station 112, 112x is backed on a sound reflecting surface 120.

In the sub step 206b, sound is emitted towards the sound reflective surface 120, such that the emitted sound enters the planar object 102, 102a-e at the second major surface and propagates through the planar object 102, 102a-e to the sound reflective surface 120.

In the sub step 206c, sound exiting the second major surface of the planar object 102, 102a-e and being reflected by the sound reflecting surface 120 is received.

In the sub step 206d the property related to sound absorption based on the emitted sound and the received sound is determined.

In a fourth step 208 of the method 200, the planar objects 102, 102a-e are sorted based on their respective determined properties in to a plurality of fractions 116a-d, 116w using a sorting station 116. At least one of the plurality of fractions 116a-d, 116w is used for assembling planar objects 102, 102a-e comprising compressed mineral fiber material. For instance, planar objects of similar thickness and having similar sound absorption may advantageously be assembled to form new planar objects 102, 102a-e comprising compressed mineral fiber material. It is thus possible to assemble relatively speaking large planar objects 102, 102a-e from smaller parts or portions of the planar objects 102, 102a-e being recycled and hence sorted into a plurality of fractions 116a-d, 116w.

The method 200 may also include determining at least one of: a property related to length, a property related to width, a property related to fiber type, a property related to binder type, a property related to presence of a surface layer and a property related to humidity level, wherein the at least one determined property is associated to each of the planar objects 102, 102a-e.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Additionally, even though the inventive concept has been described with reference to specific exemplifying variants thereof, many different alterations, modifications and the like will become apparent for those skilled in the art. Variations to the disclosed variants may be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A system for recycling planar objects having a first major surface and an opposing, second major surface, the planar objects comprising compressed mineral fiber material, the system comprising:
   a conveyor arranged to sequentially covey the planar objects one by one through a number of stations along a conveyor direction, the number of stations at least comprising:
      a thickness measurement station arranged to determine a property related to thickness and associated to each of the planar objects being conveyed through the thickness measurement station, and
      a sound measurement station arranged to determine a property related to sound absorption and associated to each of the planar objects being conveyed through the sound measurement station, the sound measurement station comprising,
         a sound reflecting surface arranged to back the first major surface of each planar object being conveyed through the sound measurement station,
         a sound emitter arranged to emit sound towards the sound reflecting surface,
         a sound receiver arranged to receive sound reflected from the sound reflecting surface, and
         a converter arranged to determine the property related to sound absorption based on the emitted sound and the reflected sound, and
      a sorting station arranged to sort the planar objects based on their respective determined properties in to a plurality of fractions.

2. The system according to claim 1, wherein the thickness measurement station comprises a camera based thickness measurement system arranged to determine the property related to thickness and associated to each of the planar objects.

3. The system according to claim 1, wherein the thickness measurement station comprises a thickness laser gauge arranged to determine the property related to thickness and associated to each of the planar objects.

4. The system according to claim 1, wherein the sound receiver of the sound measurement station is arranged to measure particle velocity and sound pressure of the received sound.

5. The system according to claim 1, wherein the conveyor is arranged to continuously convey the planar objects one by one through the number of stations.

6. The system according to claim 1, wherein the conveyor is arranged to intermittently convey the planar objects one by one through the number of stations.

7. The system according to claim 1, wherein the conveyor is arranged to convey the planar objects in an upright position or in a lying position.

8. The system according to claim 1, further comprising a length measurement station arranged to determine a property related to length and associated to each of the planar objects being conveyed through the length measurement station.

9. The system according to claim 1, further comprising a width measurement station arranged to determine a property related to width and associated to each of the planar objects being conveyed through the width measurement station.

10. The system according to claim 1, further comprising a weight measurement station arranged to determine a property related to weight and associated to each of the planar objects being conveyed through the weight measurement station.

11. The system according to claim 1, further comprising a fiber type measurement station arranged to determine a property related to fiber type and associated to each of the planar objects being conveyed through the fiber type measurement station.

12. The system according to claim 1, further comprising a binder type measurement station arranged to determine a property related to binder type and associated to each of the planar objects being conveyed through the binder type measurement station.

13. The system according to claim 1, further comprising a surface layer detection station arranged to determine a property related to presence of a surface layer and associated to each of the planar objects being conveyed through the surface layer detection station.

14. The system according to claim 1, further comprising a humidity level measurement station arranged to determine a property related to humidity level and associated to each of the planar objects being conveyed through the humidity level measurement station.

15. A method for recycling planar objects having a first major surface and an opposing, second major surface, the planar objects comprising compressed mineral fiber material, the method comprising:
- sequentially conveying the planar objects one by one through a number of stations along a conveyor direction to determine a number of properties,
- determining a property related to thickness and associated to each of the planar objects using a thickness measurement station while conveying each of the planar objects through the thickness measurement station,
- determining a property related to sound absorption and associated to each of the planar objects using a sound measurement station while conveying each of the planar objects through the sound measurement station, wherein determining the property related to sound absorption comprises;
  - backing the first major surface of a planar object being conveyed through the sound measurement station on a sound reflecting surface,
  - emitting sound towards the sound reflective surface, such that the emitted sound enters the planar object at the second major surface and propagates through the planar object to the sound reflective surface,
  - receiving sound exiting the second major surface of the planar object and being reflected by the sound reflecting surface, and
  - determining the property related to sound absorption based on the emitted sound and the received sound, and
- sorting the planar objects based on their respective determined properties in to a plurality of fractions using a sorting station, wherein at least one of the plurality of fractions is used for assembling planar objects comprising compressed mineral fiber material.

16. The method of claim 15, further comprising determining at least one of: a property related to length, a property related to width, a property related to fiber type, a property related to binder type, a property related to presence of a surface layer, and a property related to humidity level, wherein the at least one determined property is associated to each of the planar objects.

* * * * *